United States Patent
Choi

(10) Patent No.: US 6,766,384 B2
(45) Date of Patent: Jul. 20, 2004

(54) METHOD FOR AVOIDING DATA COLLISION IN HALF-DUPLEX MODE USING DIRECT MEMORY ACCESS LOGIC

(75) Inventor: Seung Woog Choi, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 544 days.

(21) Appl. No.: 09/770,183

(22) Filed: Jan. 29, 2001

(65) Prior Publication Data

US 2001/0011309 A1 Aug. 2, 2001

(30) Foreign Application Priority Data

Jan. 28, 2000 (KR) .......................................... 2000-4324

(51) Int. Cl.$^7$ .............................................. G06F 13/00
(52) U.S. Cl. ........................ 710/25; 710/105; 710/308
(58) Field of Search ........................ 710/22–29, 33–35, 710/71–74, 305–308, 105–110

(56) References Cited

U.S. PATENT DOCUMENTS

| | | | | |
|---|---|---|---|---|
| 4,556,939 A | * | 12/1985 | Read ........................... | 710/305 |
| 4,823,312 A | * | 4/1989 | Michael et al. ................ | 710/71 |
| 5,485,583 A | * | 1/1996 | Cunningham et al. ......... | 710/25 |
| 5,729,701 A | * | 3/1998 | Eriksson ....................... | 710/110 |
| 5,737,633 A | * | 4/1998 | Suzuki ......................... | 710/29 |
| 6,526,467 B1 | * | 2/2003 | Joh ............................. | 710/305 |

* cited by examiner

*Primary Examiner*—Christopher B. Shin
(74) *Attorney, Agent, or Firm*—Fleshner & Kim, LLP

(57) ABSTRACT

A method for avoiding data collision in a half-duplex mode using a DMA logic for multi-point linked processors is disclosed. According to the disclosed method, a transmitting processor holds a request-to-send (RTS) signal in an active state for a prescribed period of time so that a transmitting DMA logic of a receiving processor can be initiated after the operation of a receiving DMA logic of the receiving processor is terminated. Since the Tx DMA logic of the receiving processor starts data transmission after the Rx DMA logic of the receiving processor completes receiving of data, data collisions occurring in the receiving processor due to the concurrent operation of the Tx DMA logic and the Rx DMA logic can be prevented.

22 Claims, 3 Drawing Sheets

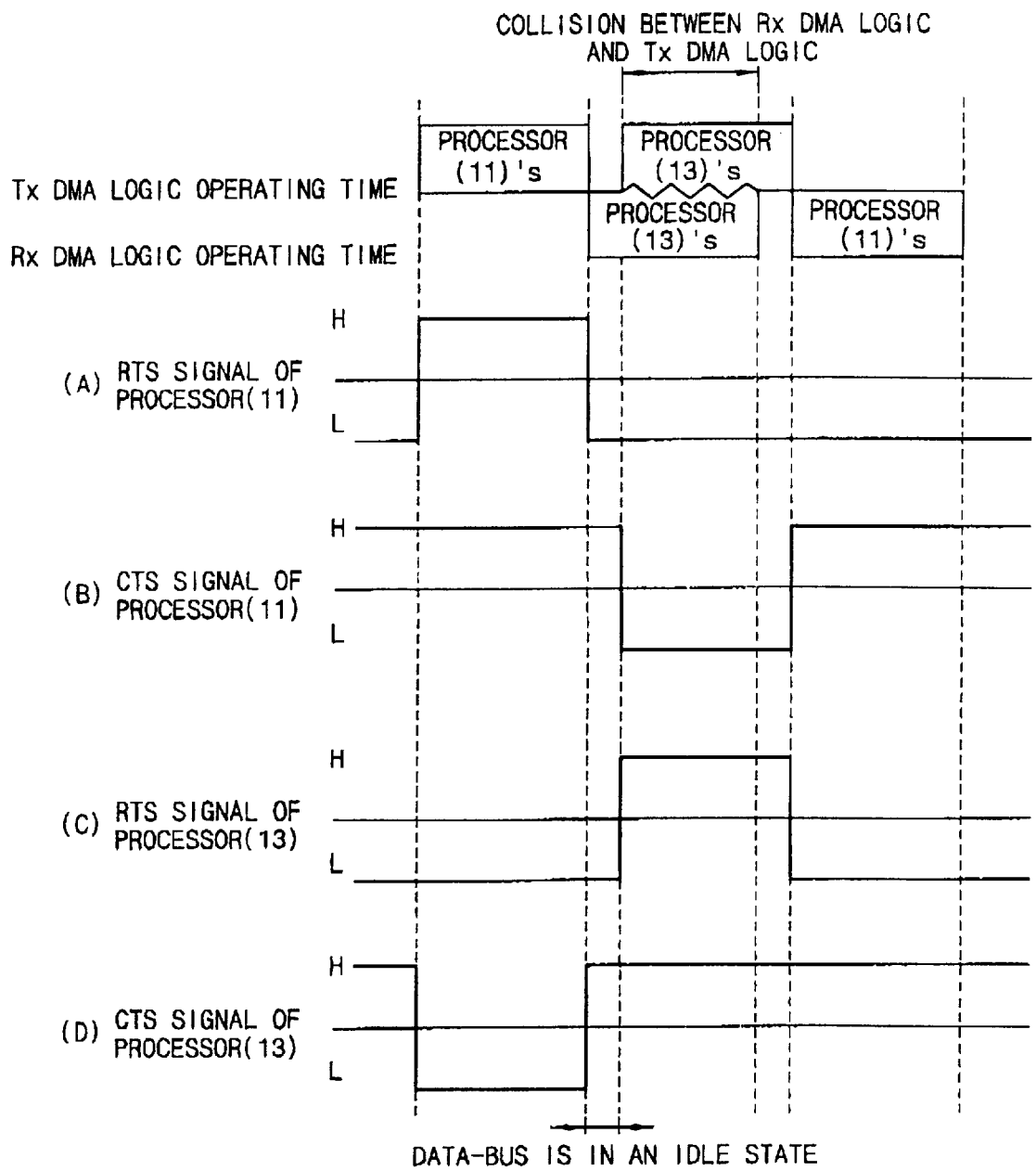

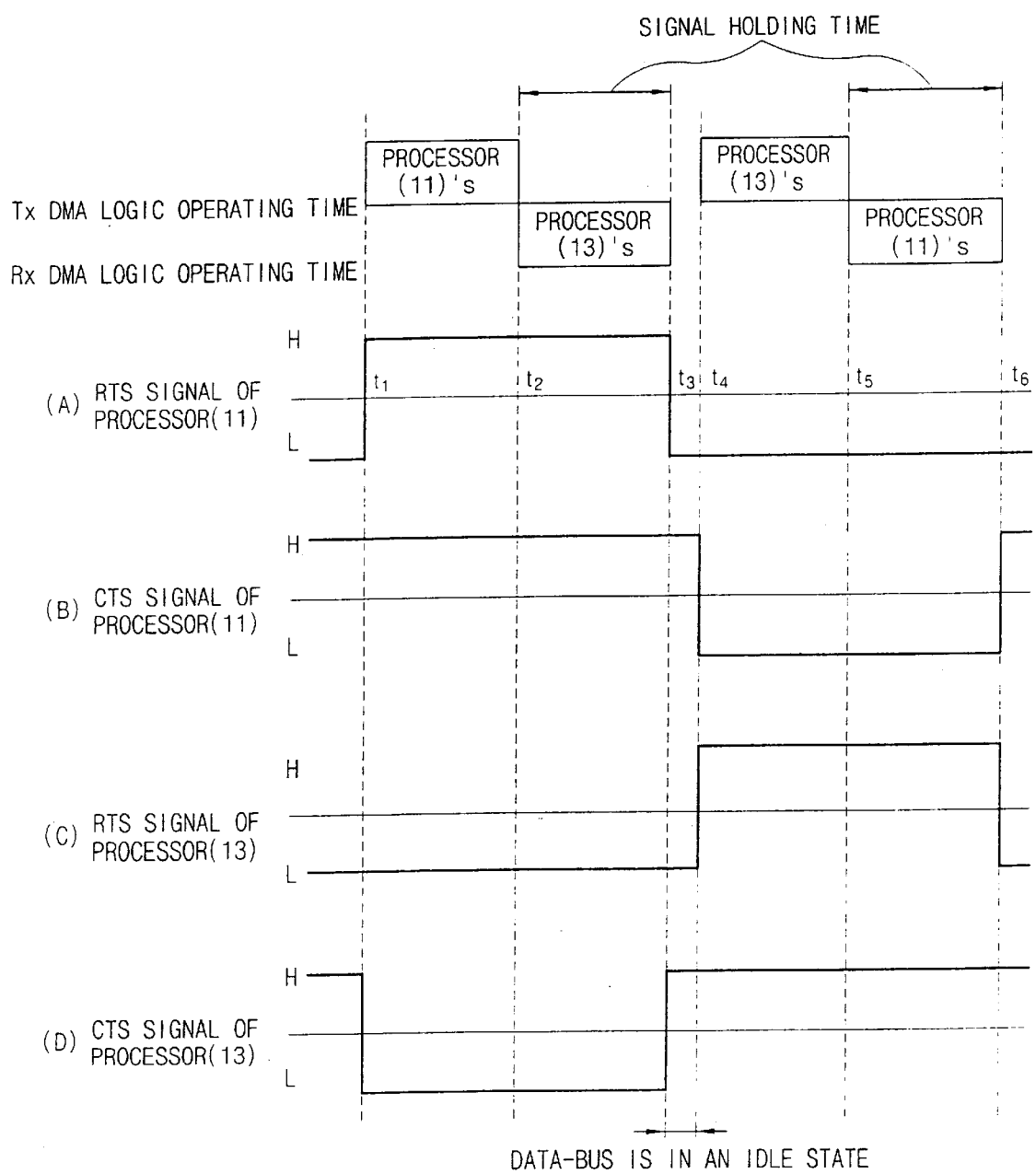

METHOD FOR AVOIDING DATA COLLISION IN HALF-DUPLEX MODE USING DIRECT MEMORY ACCESS LOGIC

BACKGROUND OF THE INVENTION

1. Field of the Invention

The present invention relates to a Direct Memory Access (DMA) logic of a half-duplex mode, and more particularly, to a method for avoiding data collisions in a half-duplex mode using direct memory access logic.

2. Background of the Related Art

Transmission systems for data communications typically include simplex and duplex communication methods. The duplex communication method includes a half-duplex transmission and a full-duplex transmission.

The half-duplex transmission is a method in which the direction of data transmission is switched over between two devices to offer each device the opportunity to transmit data to the other. In such a case, concurrent transmitting and receiving is not possible between the two devices.

A Direct Memory Access (DMA) logic is a hardware device that allows transmission and reception of data to be directly controlled. The DMA logic uses a DMA controller (DMAC) to process data between a memory and an input/output unit, without the intervention of a CPU. This has the advantage that it is able to quickly process an input and an output, allowing a large amount of data to be transmitted at a high speed.

FIG. 1 is a schematic block diagram of a related art system of multi-point linked processors for performing a half-duplex transmission.

As shown in FIG. 1, a plurality of processors 11, 12, and 13 are coupled to each other and a RTS/CTS controller 14 with one data bus and two signal lines 21 and 22 in the multi-point linked processors. The plurality of processors 11, 12, and 13 include a transmission control logic (Tx DMA) and a receiving control logic (Rx DMA), respectively, to perform transmitting and receiving of data.

Since the data transmission and reception is carried out over one data bus in the multi-point linked processors, when several processors transmit data at the same time, the data inevitably collides.

Thus, in order to avoid such a data collision, each processor 11~13 signals its intention to transmit data through the signal line 22 when it desires to transmit a data. Each processor 11~13 is then controlled by the RTS/CTS controller 14 through the signal line 21. Thus, when the processors 11, 12, and 13 are not transmitting data, they transmit a low level request-to-send (RTS) signal to the RTS/CTS controller 14, signifying a state that data bus is idle.

Upon receipt of the low level RTS signal, the RTS/CTS controller 14 transmits a high level CTS (Clear To Send) signal to all of the processors 11~13 through the signal line 21, informing that the bus is currently available for data transmission.

Thus, when the processor 11 intends to transmit a data to the processor 13, the transmitting processor 11 changes its low level RTS signal to a high level RTS signal, and initiates the TX DMA logic to start data transmission. When the data transmission of the Tx DMA logic of the transmitting processor 11 is completed, the receiving processor 13 initiates the Rx DMA logic to receive the data.

Additionally, when the data transmission of the Tx DMA logic is completed, the transmitting processor 11 changes its high level RTS signal back to a low level RTS signal, and the RTS/CTS controller 14, receiving the low level RTS signal from the transmitting processor 11, transmits a high level CTS signal to all of the processors 11~13, indicating that the data bus is in an idle state.

FIG. 2 is a timing diagram depicting the related art data transmission between the multi-point linked processors of a half-duplex transmission mode.

With reference to FIG. 2, a case where the processor 11 has data to be transmitted to processor 13, and processor 13 also has data to be transmitted to processor 11 will be taken as an example for descriptions hereinafter.

When the data bus is in an idle state, processor 11 transmits a high level RTS signal through signal line 22 upon determining the idle state of the data bus. Processor 11 then initiates the Tx DMA logic to transmit data. When the data transmission is completed, processor 11 terminates the Tx DMA logic and changes the high level RTS signal to a low level RTS signal. When the Tx DMA logic has completed, the Rx DMA logic of processor 13 is initiated to receive the data.

In this respect, however, during the transition of the RTS signal, the processor 11 changes the RTS signal from the low level to the high level without confirming whether the Rx DMA logic of the processor 13 has completely received the data.

Meanwhile, the processor 13, which has been monitoring the state of the signal line 21, immediately changes its RTS signal from the low level to the high level when it identifies the idle state of the data bus. Processor 13 then initiates the Tx DMA logic to start data transmission. During this process, processor 13 starts the Tx DMA logic and transmits its data without confirming whether its own Rx DMA logic has completely received the incoming data.

The related art DMA logic has various problems. For example, during the process of transmitting and receiving data, if there is no Tx data on the data bus regardless of the state of the transmitting and receiving processors, that is, the CTS is in a high state, the data is transmitted. Thus, in the related art DMA logic, there is a high possibility of data collision between the Tx DMA logic and the Rx DMA logic of the receiving processor. In addition, concurrent operations of the Tx DAM logic and the Rx DMA logic within the receiving processor can cause a problem of data loss.

The above references are incorporated by reference herein where appropriate for appropriate teachings of additional or alternative details, features and/or technical background.

SUMMARY OF THE INVENTION

It is an object of the present invention to provide a DMA logic and a method of using the DMA logic which substantially obviates the problems caused by, limitations and disadvantages of the related art.

Another object of the present invention is to provide a method for avoiding data collisions in a half-duplex mode using a DMA logic.

Another object of the present invention is to provide a DMA logic and method thereof that is capable of avoiding a collision between a Tx DMA logic and an Rx DMA logic of a receiving processor when a data is transmitted according to a half-duplex mode.

To achieve at least these there is provided a method for avoiding data collision in a half-duplex mode using a DMA logic for multi-point linked processors in which data is transmitted and received in a half-duplex mode, wherein a transmitting processor holds a request-to-send (RTS) signal in an active state for a predetermined time so that a transmitting DMA logic of a receiving processor can be started after the operation of a receiving DMA logic of the receiving processor is terminated.

To further achieve at least the above objects, there is provided a method for avoiding data collision in a half-duplex mode using a DMA logic for multi-point linked processors in which data is transmitted and received in a half-duplex mode, including the steps of: activating a request-to-send (RTS) signal and transmitting a data from a transmitting processor to a receiving processor through a data bus; holding the RTS signal in an active state when the data is completely transmitted; receiving a data from the transmitting processor for a predetermined time by a receiving DMA logic of the receiving processor; and transmitting a data through the same data bus by a transmitting DMA logic of the receiving processor when the data is completely received.

In the above method, the predetermined time is preferably set the same as the starting time of the Tx DMA of the transmitting processor and varied depending on the length of a transmission data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 is a timing diagram depicting the half-duplex transmission between multi-point linked processors in accordance with the related art; and FIGS. 3A through 3D are timing diagrams depicting the half-duplex transmission between multi-point linked processors in accordance with a preferred embodiment of the present invention.

DETAILED DESCRIPTION OF PREFERRED EMBODIMENTS

Figure 1:
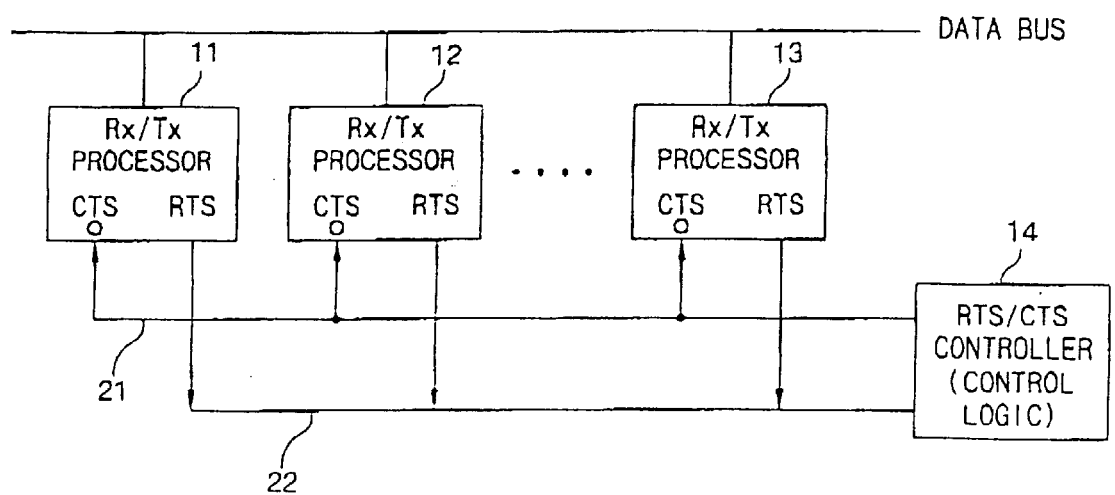
FIG. 1 is a schematic block diagram of related art multi-point linked processors in a general half-duplex transmission mode.

Reference will now be made in detail to the preferred embodiments of the present invention, examples of which are illustrated in the accompanying drawings.

In the DMA logic of the preferred embodiment of the present invention, even after a transmitting processor completely transmits data, it holds a request-to-send (RTS) signal in an active state for a prescribed period of time. The Tx DMA logic is not therefore started until a Rx DMA logic of the receiving processor is terminated, thereby preventing data collision between the Rx DMA and the Tx DMA of the receiving processor.

For purpose of example, a case in which processor 11 (FIG. 1) has a data to be transmitted to processor 13, and processor 13 also has data to be transmitted to processor 11 will be described. It should be understood that any number of processor could be used, and this method can be used for any combination of transmission and reception.

When the data bus is in an idle state, the processor 11 transits the RTS signal from a low level to a high level at the time 't1' as shown in FIG. 3A, and transmits the high level RTS signal through the signal line 22 to the RTS/CTS controller 14. Upon receipt of the RTS signal, the RTS/CTS controller 14 transmits a high level CTS signal to the processor 11 without changing the CTS signal level, as shown in FIG. 3B, signifying that the corresponding processor 11 may transmit a data.

In addition, the RTS/CTS controller 14 transmits a low level CTS to the other processors (12 and 13) signal, as shown in FIG. 3D, to prevent the other processors (12 and 13) from transmitting data. Accordingly, for so long as the CTS signal is at a low level, the processor 13 is not allowed to transmit data.

The processor 11 initiates the Tx DMA logic to start transmitting data, and when the data transmission is completed at the time 't2', processor 11 terminates the Tx DMA logic. With the Tx DMA logic of processor 11 terminated, the Rx DMA logic of the processor 13 is initiated to receive the data.

At this time, even though the Tx DMA logic has terminated at the time 't2', processor 11 continues to hold the RTS signal at a high level for a predetermined time as shown in FIG. 3A, so that the Tx DMA logic of the processor 13 completely receives the data.

The signal holding time for the RTS signal is preferably the same as the starting time of the Tx DMA of the processor 11, which may be varied depending on the length of a transmission data. That is, the signal holding time preferably becomes equivalent to the time from starting the Tx DMA logic of the transmitting party to the time for terminating it.

Thereafter, as the signal holding time elapses, the processor 11 transits the RTS signal from the high level to the low level at the time 't3', as shown in FIG. 3A, so as to inform the RTS/CTS controller 14 that the data bus is in an idle state.

Upon receipt of the low level RTS signal, the RTS/CTS controller 14 preferably transmits the high level CTS signal, as shown in FIGS. 3B and 3D, to all of the processors 11, 12 and 13, to indicate that data transmission is currently available.

When the CTS signal is at a high level, the processor 13, which has monitored the state of the signal line transits the RTS signal from the low level to the high level, and transmits the high level RTS signal through the signal line 22 to the RTS/CTS controller 14, and the RTS/CTS controller 14 transmits the low level CTS signal as shown in FIGS. 3B and 3D to the processors (11 and 12) and the high level CTS signal to the processor 13.

Accordingly, the processor 13 initiates the Tx DMA logic at the time 't4' to start transmitting data, and when the data transmission is completed at time 't5', the processor 13 terminates operation of the Tx DMA logic. The processor 11 then initiates the Rx DMA logic to start receiving the data.

At this time, the processor 13 continues to hold the RTS signal at a high level, as shown in FIG. 3D, during the signal holding time, to avoid data collision between the Tx DMA logic and the Rx DMA logic within the receiving processor.

The DMA logic and the method for avoiding data collision in a half-duplex mode using a DMA logic of the present invention has many advantages. For example, the transmitting processor holds its own RTS signal at an active state for a prescribed period of time so that the receiving processor can normally complete receiving of data.

Therefore, since the Tx DMA logic of the receiving processor starts data transmission after the Rx DMA logic of the receiving processor completes receiving of data, data collisions occurring in the receiving processor due to the concurrent operation of the Tx DMA logic and the Rx DMA logic can be prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of transmitting data in a half-duplex mode using a Direct Memory Access (DMA) logic for multi-point linked processors, comprising:
    sending a request-to-send (RTS) signal in an active state from a first processor;
    transmitting data from the first processor to a second processor; and
    holding the request-to-send (RTS) signal sent from the first processor in the active state for a prescribed period of time even though the transmission of data is complete, wherein the prescribed period of time is set based on an amount of time to fully receive data by the second processor.

2. The method of claim 1, wherein the prescribed period of time is equivalent to a duration of a transmission DMA of the first processor.

3. The method of claim 1, wherein the prescribed period of time corresponds to a length of the transmitted data.

4. The method of claim 1, wherein the RTS signal is provided by the first processor.

5. The method of claim 1, wherein the RTS signal is held in the active state until a receiving DMA logic of the second processor is terminated.

6. A method for avoiding data collision using Direct Memory Access (DMA) logic for multi-point linked processors, comprising:
    sending a request-to-send (RTS) signal from a transmitting processor;
    transmitting first data from the transmitting processor to a receiving processor through a data bus;
    holding the RTS signal sent from the transmitting processor in an active state for a prescribed period of time after the first data is transmitted, wherein the prescribed period of time is set based on an amount of time to fully receive data by the receiving processor; and
    receiving the first data from the transmitting processor for the prescribed period of time by a receiving DMA logic of the receiving processor.

7. The method of claim 6, wherein when the RTS signal is in an active state, processors other than the transmitting processor do not transmit data.

8. The method of claim 6, wherein the prescribed period of time is equivalent to an active period of a transmission DMA logic of the transmitting processor.

9. The method of claim 6, wherein the prescribed period of time corresponds to a length of transmission data.

10. The method of claim 6, wherein the receiving processor transmits second data through the data bus using a transmitting DMA logic of the receiving processor when the first data is completely received.

11. The method of claim 10, wherein the transmitting DMA logic of the receiving processor transmits the second data when the data bus is in an idle state after the receiving DMA logic of the receiving processor completes reception of the first data.

12. The method of claim 10, wherein the first and second data are transmitted and received in a half-duplex mode.

13. A Direct Memory Access (DMA) logic system, comprising:
    a plurality of processors coupled to a data bus to transmit and receive data over the data bus; and
    a transmission controller coupled to each of the plurality of processors to control data transmission by each of the plurality of processors, wherein the transmission controller sends a first signal to each of the plurality of processors when the data bus is available for transmission and sends a second signal to processors other than the transmitting processor when the transmitting processor is transmitting data and maintains the second signal for a prescribed period of time after the data transmission has ended by the transmitting processor.

14. The system of claim 13, wherein the prescribed period of rime is equivalent to a duration of the data transmission.

15. The system of claim 13, wherein the prescribed period of time is a length of time required by a receiving one of the plurality of processors to process the received data.

16. The system of claim 13, wherein each of the plurality of processors comprises transmission control logic to control transmission of data, and reception control logic to control reception of data.

17. The system of claim 13, wherein the first signal is a cleat-to-send (CTS) signal at a first level, and the second signal is a CTS signal at a second level.

18. A method comprising:
    sending a request-to-send signal from a first processor;
    transmitting data across a data bus from the first processor to a second processor;
    maintaining a state of the request-to-send signal for a predetermined period of time after transmitting data from the first processor across the data bus such that the second processor may fully receive the data; and
    changing a state of the request-to-send signal sent from the first processor after the predetermined period of time.

19. The method of claim 18, wherein the predetermined period of time is equivalent to a duration of a transmission DMA of the first processor.

20. The method of claim 18, wherein the predetermined period of time corresponds to a length of the transmitted data.

21. The method of claim 18, wherein the predetermined period of time is equal to an amount of time necessary to fully receive the transmitted data by the second processor.

22. The method of claim 18, wherein the request-to-send signal is held in an active state until a receiving DMA logic of the second processor is terminated.

* * * * *